(12) United States Patent
Morris et al.

(10) Patent No.: US 8,098,049 B2
(45) Date of Patent: Jan. 17, 2012

(54) TECHNIQUES FOR CHARGING A WIRELESS DEVICE

(75) Inventors: Julie Anne Morris, Raleigh, NC (US); Jennifer Greenwood Zawacki, Hillsborough, NC (US); Michael Thano Matthews, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 553 days.

(21) Appl. No.: 12/330,393

(22) Filed: Dec. 8, 2008

(65) Prior Publication Data

US 2010/0141217 A1 Jun. 10, 2010

(51) Int. Cl.
*H02J 7/00* (2006.01)

(52) U.S. Cl. ......... 320/137; 320/108; 320/114; 320/127

(58) Field of Classification Search ......................... None
See application file for complete search history.

(56) References Cited

U.S. PATENT DOCUMENTS

2008/0180057 A1* 7/2008 Watanabe .................... 320/103
2009/0322278 A1* 12/2009 Franks et al. ................. 320/107

* cited by examiner

*Primary Examiner* — Minh N Tang
(74) *Attorney, Agent, or Firm* — Antony P. Ng; Yudell Isidore Ng Russell PLLC

(57) ABSTRACT

A technique for charging a wireless device includes detecting a physical presence of a user with respect to the device. A magnetic force is provided between a charging pad and the device only when the physical presence of the user, with respect to the device, is not detected. In this case, a rechargeable power source of the device receives a charging current from the charging pad via conductive contacts of the device.

20 Claims, 3 Drawing Sheets

TECHNIQUES FOR CHARGING A WIRELESS DEVICE

BACKGROUND

1. Field

This disclosure relates generally to charging a device and, more specifically to techniques for charging a wireless device.

2. Related Art

Today, wire-free power solutions for mobile devices are becoming more common. For example, WildCharge, Inc. of Boulder, Colo. offers wire-free power products that include a WildCharger™ pad and WildCharger™ adapter. The WildCharger™ pad is a charging pad that can be produced using a variety of rigid or flexible materials. The charging pad has no buttons or controls and can be configured to provide power to charge and operate one or more devices (e.g., laptop computer systems, personal digital assistants (PDAs), and mobile phones) simultaneously. To facilitate device charging via a charging pad, a WildCharger™ adapter may be attached to or integrated in an electronic device.

When a charging pad enabled electronic device, such as a mobile phone, is placed on the charging pad, electrical contacts on the adapter of the device electrically contact parallel conductors formed on a surface of the charging pad. Power is then conductively transferred from the pad to the device via two of the parallel conductors and two of the electrical contacts. In general, the geometries of the electrical contacts are designed such that irrespective of the position of the device with respect to the surface of the pad, a closed electrical circuit is formed between two of the parallel conductors and two of the contacts of the device to facilitate powering and charging of the device. In a typical embodiment, one or more permanent magnets may be implemented within a device to improve conductivity between the parallel conductors and the contacts.

In contrast to a permanent magnet, an electromagnet is a type of magnet in which a magnetic field is produced in response to electric current flow. In an electromagnet, a magnetic field disappears when electric current flow through a coil of the electromagnet ceases. For example, a simple electromagnet may be produced by passing an electric current through a wire (to generate a magnetic field around the wire). In general, a magnetic field strength generated is proportional to an amount of current that passes through a wire. In order to concentrate a magnetic field generated by a wire, the wire may be wound into a coil, which includes multiple turns of wire side-by-side. In the case of a coil, a magnetic field provided by all turns of the wire pass through a center of the coil. In general, stronger magnetic fields can be produced if a core of ferromagnetic material (e.g., soft iron) is placed inside the coil. In this case, the core essentially magnifies the magnetic field. Electromagnets have been used in a wide variety of electric devices, e.g., motors and generators, relays, bells, loudspeakers, and magnetic locks.

SUMMARY

According to one or more embodiments of the present invention, a technique for charging a wireless device includes detecting a physical presence of a user with respect to the device. A magnetic force is provided between a charging pad and the device only when the physical presence of the user, with respect to the device, is not detected. In this case, a rechargeable power source of the device receives a charging current from the charging pad via conductive contacts of the device. In various embodiments, the rechargeable power source of the device may also receive the charging current from the charging pad when the magnetic force is not provided.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
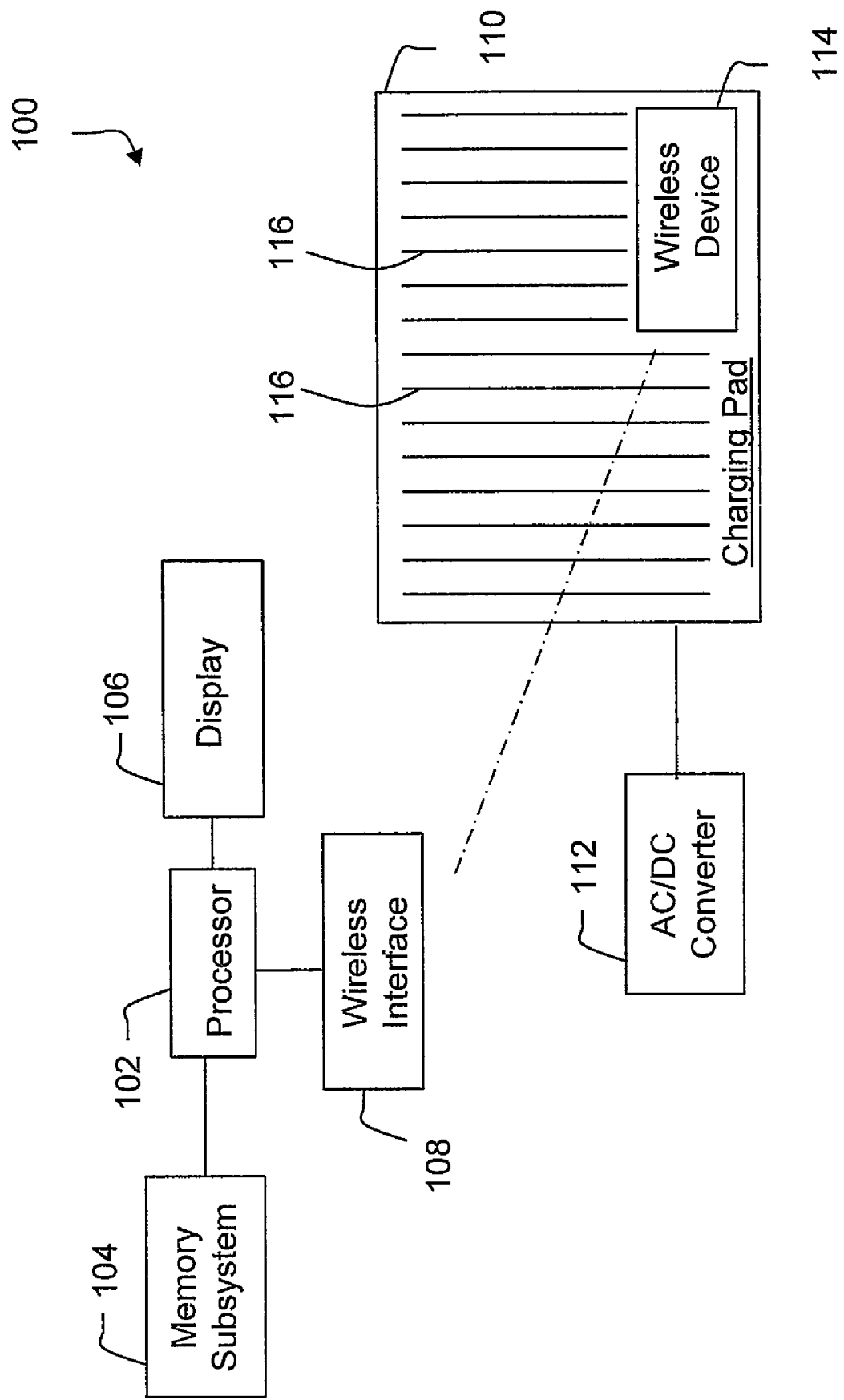
FIG. 1 is a block diagram of a relevant portion of an example computer system that is in communication with a wireless device whose rechargeable power source is configured to be charged by a charging pad, according to one or more embodiments of the present disclosure.

As will be appreciated by one of ordinary skill in the art, the present invention may be embodied as a method, system, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product on a computer-readable storage medium having computer-readable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. It should be noted that the computer-usable or computer-readable storage medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store a program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single processor, on multiple processors that may be remote from each other, or as a stand-alone software package. When multiple processors are employed, one processor may be connected to another processor through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. As used herein, the term "coupled" includes both a direct electrical connection between blocks or components and an indirect electrical connection between blocks or components achieved using one or more intervening blocks or components.

According to various aspects of the present disclosure, techniques are disclosed herein that facilitate charging a wireless device utilizing a charging pad. In various embodiments, a magnetic force (between the wireless device and the charging pad) is enabled or disabled based upon a presence of a user with respect to the wireless device. That is, when a user is using a wireless device, a magnetic force (provided between the device and a charging pad) is discontinued such that that user can more easily move the device across the face of the charging pad. For example, when the device is a wireless mouse, discontinuing the magnetic force allows a user to more easily move the mouse across a surface of the charging pad. On the other hand, when a user is not operating the mouse, the magnetic field is provided to increase continuity between electrical contacts of the mouse and parallel conductors of the charging pad.

With reference to FIG. 1, an example computer system 100 is illustrated that includes a processor 102 that is coupled to a memory subsystem 104, a wireless interface 108, and a display 106. The wireless interface 108 may be, for example, coupled to a universal serial bus (USB) port of the system 100. The display 106 may, for example, correspond to a liquid crystal display (LCD) or a cathode ray tube (CRT). The processor 102 may include one or more central processing units (CPUs)) and the memory subsystem 104 includes an application appropriate amount of volatile and non-volatile memory. As is illustrated, the system 100 also includes a charging pad 110 that provides direct current (DC) power to a wireless device 114 (when electrical contacts of the device 114 are in electrical contact with parallel conductors 116 formed on a surface of the pad 110). The pad 110 is coupled to an AC/DC converter 112, which receives alternating current (AC) power from an AC power source (not shown). The converter 112 converts the AC power to DC power. The device 114 receives a charging current from the pad 110 when two of the electrical contacts of the device 114 are in physical contact with two of the parallel conductors 116 (assuming the converter 112 is providing DC power to the pad 110).

The device 114 may receive power from the pad 110 irrespective of whether a magnetic force is provided between the pad 110 and the device 114 (assuming the converter 112 is providing DC power to the pad 110). The system 100 may also include, for example, a video card, a hard disk drive (HDD), a network interface card (NIC), a compact disk read-only memory (CD-ROM) drive, among other components not shown in FIG. 1. The system 100 may be, for example, a personal computer (PC), or virtually any other device that benefits from having an associated wireless device that receives power from a charging pad and discontinues a magnetic force provided between the device and the charging pad when a hand (or other body part) of an individual is sensed to be in close proximity to the device.

Figure 2:
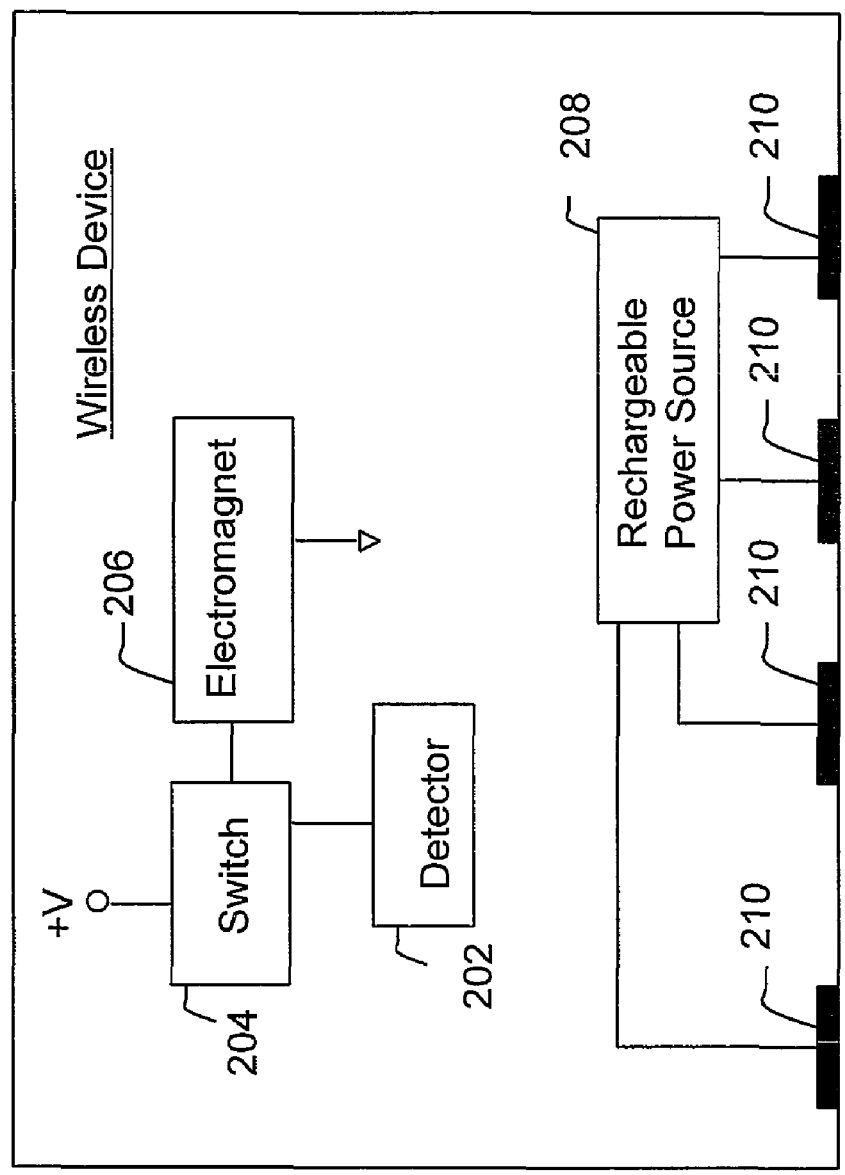
FIG. 2 is a block diagram of a relevant portion of a wireless device that is configured to be charged by a charging pad, according to one or more embodiments of the present disclosure.

Turning to FIG. 2, the wireless device 114 is further illustrated, according to one embodiment of the present disclosure. As is illustrated, the device 114 includes a detector 202, a switch 204, an electromagnet (e.g., including a coil and a ferromagnetic core) 206, a rechargeable power source (e.g., a battery module including one or more batteries) 208, and contacts 210. The contacts 210 may, for example, be arranged on a surface of the device 114 in a manner similar to that of an adapter made commercial available by WildCharge, Inc. Alternatively the contacts 210 may be arranged in any other manner that is compatible with receiving power from an associated charging pad 110. While four of the contacts 210 are employed in one embodiment, it should be appreciated that the techniques described herein are applicable to devices that have more or less than four contacts.

The detector 202 may be, for example, a capacitive sensor that is configured to detect a physical presence of a user with respect to the device 114, with or without actual contact of the user with the device 114. For example, when the device 114 is a wireless mouse, a capacitive sensor may be positioned to sense a finger of a user in contact with a button of the mouse or a palm of the user in contact with a top portion of the mouse. In another embodiment, the detector 202 may take the form of a pressure sensitive switch. In this case, the detector 202 may be omitted as the switch 204 performs the functionality of both a switch and a detector. In either case, when the physical presence of the user with respect to the device 114 is detected, a current provided to a coil of electromagnet 206 is interrupted. The rechargeable power source 208 may correspond to, for example, one or more rechargeable batteries. When multiple rechargeable batteries are employed in the power source 208, the batteries may be coupled in series, in parallel, or in a series-parallel configuration.

Figure 3:
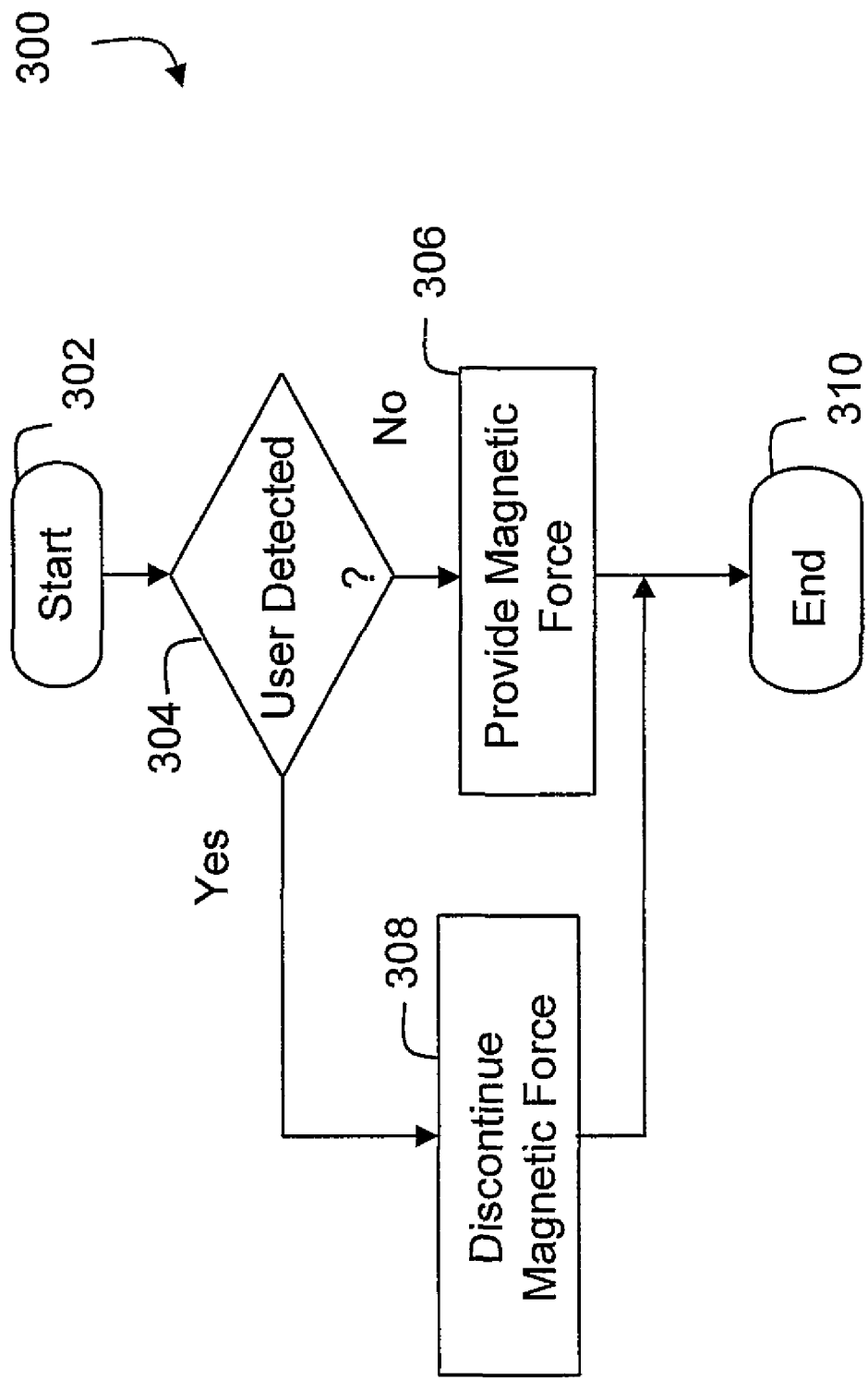
FIG. 3 is a flowchart of an example process for charging a wireless device with a charging pad, according to one or more embodiments of the present disclosure.

Moving to FIG. 3, an example process 300 for charging a wireless device according to an embodiment of the present disclosure is illustrated. For ease of understanding, the process 300 is discussed in conjunction with the system 100 of FIG. 1 and in conjunction with the wireless device 114 of FIG. 2. The process 300 is initiated in block 302, at which point control transfers to decision block 304. In block 304, the detector 202 provides an indication of whether a physical presence of a user with respect to the device 114 is detected. As noted above, the device 114 may employ a capacitive sensor, a pressure sensitive sensor, or another sensor (e.g., a balance point that is tipped to discontinue a magnetic force when a hand of a user is place of the device 114) to detect the presence of the user. An implemented detector may work on proximity of a user with the device or require contact by the user with the device 114.

When the user is not detected in block 304, control transfers to block 306. In block 306, a magnetic force is provided between the charging pad 110 and the device 114 by providing (or maintaining) current flow through a coil of the electromagnet 206. In this case, the rechargeable power source 208 of the device 114 receives (or continues to receive) a charging current from the charging pad 110, via conductive contacts 210 of the device 114. When a user is detected in block 304 control transfers to block 308, where the magnetic force is discontinued by interrupting the current flow through the coil of the electromagnet 206. In this manner, the user can then more easily move the device 114 with respect to the charging pad 110. As noted above, when the magnetic force is not applied between the device 114 and the pad 110, charging of the device 114 may continue or be interrupted. Following block 306 and 308 control transfers to block 310 where the process 300 terminates. Accordingly, techniques have been described herein that more readily facilitate movement of a wireless device with respect to a charging pad such that the device does not have to be removed from the charging pad prior to operation of the device and placed back on the charging pad following operation of the device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a, an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in any kind of system that includes a hard disk drive. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method, comprising:
    detecting a physical presence of a user with respect to a wireless device, wherein the device includes a magnet; and
    providing, using the magnet in the device, a magnetic force between conductive contacts of a charging pad and the device only when the physical presence of the user, with respect to the device, is not detected, wherein a rechargeable power source of the device receives a charging current from the conductive contacts of the charging pad, via electrical contacts of the device, when the magnetic force is provided, and wherein the conductive contacts are formed as parallel conductors on a surface of the charging pad.

2. The method of claim 1, further comprising:
    discontinuing the providing of the magnetic force between the charging pad and the conductive contacts of the device when the physical presence of the user, with respect to the device, is detected.

3. The method of claim 1, wherein the device includes a capacitive sensor and the method further comprises:
    sensing the presence of the user with respect to the device using the capacitive sensor.

4. The method of claim 1, wherein the device includes a pressure sensor and the method further comprises:
    sensing the presence of the user with respect to the device using the pressure sensor.

5. The method of claim 4, wherein the pressure sensor is a pressure sensitive switch, the magnet is an electromagnet, and the method further comprises:
    discontinuing providing current through a coil of the electromagnet that creates the magnetic force responsive to sensing the presence of the user with respect to the device using the pressure sensor.

6. The method of claim 1, wherein the device is a wireless mouse and the rechargeable power source includes a rechargeable battery that receives the charging current from the charging pad via the conductive contacts.

7. The method of claim 1, wherein the device is a wireless pointing device.

8. A wireless apparatus, comprising:
    a detector configured to detect a physical presence of a user with respect to the apparatus;
    an electromagnet configured to be energized, to create a magnetic force between conductive contacts of a charging pad and the apparatus, only when the detector does not detect the physical presence of the user with respect to the apparatus, wherein the conductive contacts are formed as parallel conductors on a surface of the charging pad; and a rechargeable power source configured to receive a charging current from the conductive contacts of the charging pad via electrical contacts of the apparatus.

9. The apparatus of claim 8, wherein the electromagnet is configured to be de-energized when the detector detects the physical presence of the user with respect to the apparatus.

10. The apparatus of claim 8, wherein the detector includes a capacitive sensor that is positioned to sense the presence of the user with respect to the apparatus.

11. The apparatus of claim 8, wherein the detector includes a pressure sensor that is configured to sense the presence of the user with respect to the apparatus.

12. The apparatus of claim 11, wherein the pressure sensor is a pressure sensitive switch that is configured to discontinue providing current through a coil of the electromagnet responsive to sensing the presence of the user with respect to the apparatus.

13. The apparatus of claim 8, wherein the apparatus is a wireless mouse and the rechargeable power source includes a rechargeable battery that receives the charging current from the conductive contacts of the charging pad, via the electrical contacts, when the detector does not detect the physical presence of the user with respect to the wireless mouse.

14. The apparatus of claim 8, wherein the apparatus is a wireless pointing device.

15. A wireless apparatus, comprising:
 a detector configured to detect a physical presence of a user with respect to the apparatus, wherein the apparatus is a wireless mouse;
 an electromagnet configured to be energized to create a magnetic force between conductive contacts of a charging pad and the apparatus only when the detector does not detect the physical presence of the user with respect to the apparatus, wherein the conductive contacts are formed as parallel conductors on a surface of the charging pad; and
 a rechargeable power source configured to receive a charging current from the conductive contacts of the charging pad, via electrical contacts of the apparatus.

16. The apparatus of claim 15, wherein the electromagnet is configured to be de-energized when the detector detects the physical presence of the user with respect to the apparatus.

17. The apparatus of claim 16, wherein the detector includes a capacitive sensor that is positioned to sense the presence of the user with respect to the apparatus.

18. The apparatus of claim 16, wherein the detector includes a pressure sensor that is configured to sense the presence of the user with respect to the apparatus.

19. The apparatus of claim 18, wherein the pressure sensor is a pressure sensitive switch that is configured to discontinue providing current through a coil of the electromagnet responsive to sensing the presence of the user with respect to the apparatus.

20. The apparatus of claim 16, wherein the rechargeable power source includes a rechargeable battery that receives the charging current from the charging pad, via the electrical contacts, when the detector does not detect the physical presence of the user with respect to the wireless mouse.

* * * * *